United States Patent [19]

Schlachter

[11] Patent Number: 6,082,804
[45] Date of Patent: Jul. 4, 2000

[54] STORAGE ENCLOSURE FOR OPEN LOAD BED WITH TAILGATE CLOSURE

[76] Inventor: Bradley S. Schlachter, P.O. Box 12168, Dallas, Tex. 75225

[21] Appl. No.: 08/990,702

[22] Filed: Dec. 16, 1997

[51] Int. Cl.[7] ........................................................ B60R 7/02
[52] U.S. Cl. .......................... 296/37.6; 224/281; 224/404; 296/180.1
[58] Field of Search .................................. 296/37.1, 37.6, 296/180.1; 224/281, 404, 542, 547, 554

[56] References Cited

U.S. PATENT DOCUMENTS

| D. 321,159 | 10/1991 | Schlachter | D12/155 |
|---|---|---|---|
| 584,167 | 6/1897 | Shanklin | 224/401 |
| 2,867,471 | 1/1959 | Coon, Jr. | 296/23 |
| 4,215,896 | 8/1980 | Drouin | 296/24 R |
| 4,451,075 | 5/1984 | Canfield | 296/37.6 |
| 4,506,870 | 3/1985 | Penn | 296/1 S |
| 4,522,326 | 6/1985 | Tuohy, III | 224/310 |
| 4,635,992 | 1/1987 | Hamilton et al. | 296/37.6 |
| 4,749,226 | 6/1988 | Heft | 296/37.6 |
| 4,828,312 | 5/1989 | Kinkel et al. | 296/37.6 |
| 4,884,838 | 12/1989 | Slater | 296/180.1 |
| 4,938,398 | 7/1990 | Hallsen | 224/42 |
| 4,938,519 | 7/1990 | Schlachter | 296/37.6 |
| 5,083,829 | 1/1992 | Fonseca | 296/37.6 |
| 5,088,636 | 2/1992 | Barajas | 224/281 |
| 5,207,469 | 5/1993 | Rossi | 296/37.6 |
| 5,232,259 | 8/1993 | Booker | 296/37.6 |
| 5,324,089 | 6/1994 | Schlachter | 296/37.5 |
| 5,498,049 | 3/1996 | Schlachter | 296/37.6 |
| 5,564,767 | 10/1996 | Strepek | 296/26 |
| 5,564,776 | 10/1996 | Schlachter | 296/37.6 |
| 5,598,962 | 2/1997 | Schlachter | 224/542 |
| 5,816,637 | 10/1998 | Adams et al. | 296/26.09 |
| 5,853,116 | 12/1998 | Schreiner | 224/404 |
| 5,964,492 | 10/1999 | Lyon | 296/37.6 |
| 5,992,719 | 11/1999 | Carter, III | 224/404 |

FOREIGN PATENT DOCUMENTS

| 601561 | 5/1948 | France | 296/37.1 |
|---|---|---|---|
| 1168737 | 12/1958 | France | 296/37.1 |

Primary Examiner—D. Glenn Dayoan
Assistant Examiner—Paul Chenevert
Attorney, Agent, or Firm—Dennis T. Griggs

[57] ABSTRACT

The side panels of a storage enclosure are intersected by slots or slip channels that mate with support rails attached to the load bed sidewalls of a pickup truck. The storage enclosure is installed by sliding it forward, with the storage enclosure riding on the support rails to an operative position wherein the access opening of the storage enclosure is presented flush with the tailgate access opening and the storage compartment is conveniently accessible when the tailgate is open and is secured against unauthorized access when the tailgate is closed. Vertical movement of the storage enclosure relative to the load bed is blocked by engagement of slip channel shoulders against the slip rails. Forward movement of the storage enclosure is blocked by the rear wheel well fenders of the pickup truck. Rearward movement of the storage enclosure is blocked by the tailgate when it is in the closed position. The storage enclosure can be quickly removed from the load bed without tools simply by opening the tailgate and pulling the storage enclosure along the support rails until the storage enclosure separates from the load bed.

8 Claims, 5 Drawing Sheets

STORAGE ENCLOSURE FOR OPEN LOAD BED WITH TAILGATE CLOSURE

BACKGROUND OF THE INVENTION

This invention relates to a storage enclosure adapted for use at the rear of an open load bed motor vehicle such as a light duty pickup truck.

In the course of using utility motor vehicles including light duty trucks in connection with various jobs, controlled or organized storage space is needed for luggage, tools, equipment, supplies and items of value that may require reasonably secure storage and shelter from the elements. The increasingly widespread use of open load bed pickup trucks by tradesmen as well as for personal transportation vehicles has increased the need for improvements in storage enclosures in such vehicles which may be used for transporting and safe-guarding tools, equipment, construction materials and other articles of value. Certain other types of vehicles such as vans, sport-utility vehicles and station wagons also lack organized, confined storage space adjacent the rear door or tailgate.

It is known to provide storage enclosures or trunks for securing portable property such as tools, luggage and equipment on the open load bed of a utility vehicle or light duty truck. For example, pickup trucks include a generally rectangular box-like load bed, and storage enclosures and security trunks have been developed which mount on the forward portion of the load bed, just behind the vehicle cab. Although such enclosures provide secure and substantially weather-tight storage for property, they are difficult to access for loading and unloading purposes.

It has also been proposed to mount tool boxes or enclosures on the hinged tailgates of vehicles such as pickup trucks, wherein spaced apart stanchions are secured to the tailgate and support a toolbox on trunnions which permit the toolbox to remain in a horizontal or upright position when the tailgate is open or closed. However, the clearance required to maintain such a toolbox in an upright position, regardless of the position of the tailgate, requires the toolbox to occupy a considerable amount of space within the load bed.

It is often desirable to open the tailgate for insertion or removal of articles which have an overall length substantially the same as or slightly greater than the length of the load bed itself. Moreover, it is often necessary for tradesmen and craftsmen to use the tailgate in the open position as a work support surface while having ready access to tools, equipment and supplies near or adjacent to the tailgate. Still further, the entire deck of the load bed is sometimes needed for storage of materials when the tailgate is in an open or closed position. Front mounted tool boxes or storage enclosures do not satisfy that requirement. Moreover, other conventional storage enclosures for open load bed vehicles are difficult to remove from the load bed when the entire load bed space is needed.

My U.S. Pat. Nos. 5,598,962; 5,564,776; 5,498,049; 5,324,089; and 4,938,519 disclose and claim certain improvements in storage enclosures for motor vehicles equipped with hinged tailgates.

BRIEF SUMMARY OF THE INVENTION

The present invention provides a unique storage enclosure or trunk for utility vehicles, including in particular, light duty open load bed pickup trucks and other vehicles that have a hinged tailgate mounted across the access opening of the load bed. The enclosure provides storage space for tool boxes, containers, tools, equipment and other articles which are to be secured within a convenient storage compartment and sheltered from the elements.

In accordance with one important aspect of the invention, a storage enclosure is adapted to be quickly mounted on and removed from the load bed of a utility vehicle, such as a pickup truck, extending between the sidewalls of the load bed in an operative position at the rear access opening thereof and adjacent to a hinged tailgate which forms a closure for the load bed access opening and the storage enclosure. The enclosure includes a generally horizontal top panel, a depending forward panel and laterally spaced, depending side panels. Each side panel is intersected by a slot or channel that engages a support member, for example a slip rail, attached to each load bed sidewall, respectively. The storage enclosure is installed by sliding it forward, with the storage enclosure riding on the support members, to the operative position.

In the operative position, the access opening of the storage enclosure is presented substantially flush with the tailgate access opening, so that the storage compartment is conveniently accessible when the tailgate is open and is secured against unauthorized entry when the tailgate is closed. Movement of the storage enclosure is blocked by the support members and by the tailgate when it is closed. The storage enclosure can be removed quickly and without tools by opening the tailgate and pulling the storage enclosure along the support members until the storage enclosure separates from the load bed. According to this arrangement, the storage enclosure and support members cooperate with the load deck sidewalls and tailgate to prevent removal of the enclosure from the load bed, with access to the storage compartment being provided only upon opening the tailgate.

The storage enclosure can be quickly installed or removed to permit utilization of the full length of the load deck of the vehicle, does not interfere with use of the tailgate as a work or support surface when mounted on the support members, and provides convenient access to articles stored in the enclosure directly adjacent the tailgate access opening when the tailgate is open.

Those skilled in the art will further appreciate the advantages and superior features of the present invention as well as other important aspects thereof upon reading the detailed description which follows with reference to the drawings.

DETAILED DESCRIPTION OF THE INVENTION

In the description which follows, like parts are marked throughout the specification and drawing with the same reference numerals, respectively. The drawing figures are not necessarily to scale in the interest of clarity.

Figure 1:
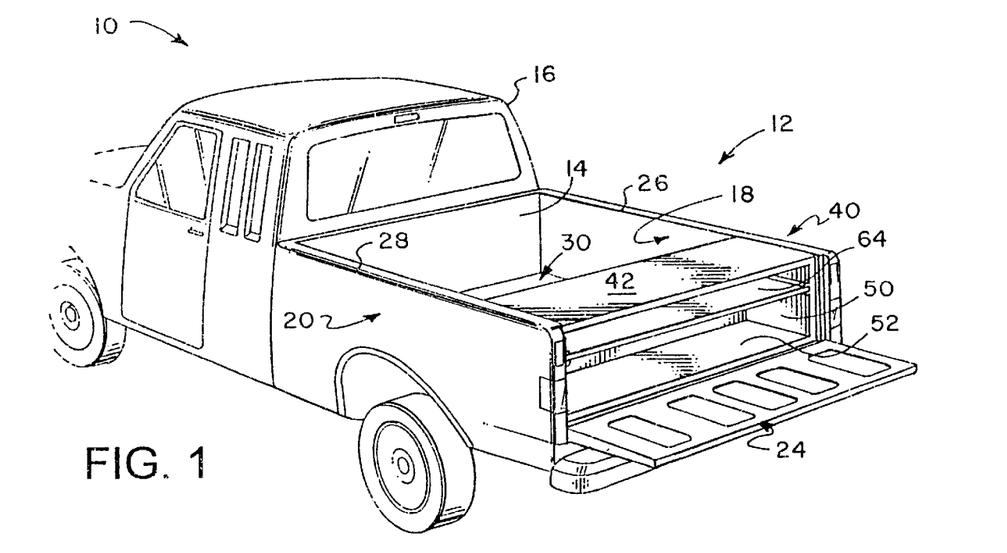
FIG. 1 is a rear perspective view of a vehicle storage enclosure shown mounted on the rear load bed of an open load bed pickup truck with the storage enclosure access opening substantially in alignment with the tailgate access opening.
Figure 2:
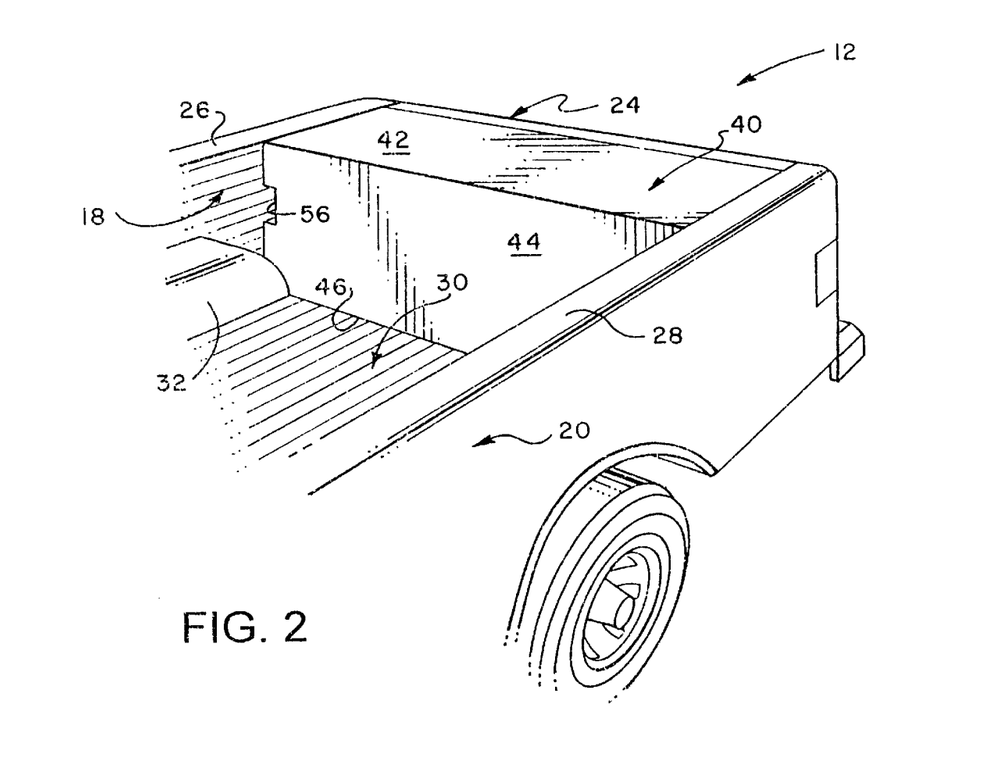
FIG. 2 is a side perspective view thereof.

Referring to FIGS. 1 and 2, there is shown a motor vehicle, generally designated by the numeral 10, which in typical installations is a light duty pickup truck. The vehicle 10 has a generally rectangular load bed 12, a portion of which is shown in the drawing figures and includes a front wall 14, rearward of a cab 16, opposed deck sidewalls 18 and 20 and a rear access opening 22 between the deck sidewalls. The rear access opening 22 can be closed by a hinged tailgate 24 of conventional construction, being movable between a generally horizontal, open position shown in FIG. 1 and an upright, closed position as shown in FIG. 2.

The deck sidewalls 18 and 20 have fabricated longitudinal beam portions 26, 28 extending along their top edges as shown in FIG. 1 and FIG. 2. Accordingly, the deck sidewalls are recessed from the inner side edges of the beams 26 and 28 so that the transverse width of the load bed 12 is typically greater than the transverse width of the rear access opening 22 and the distance between the beam portions 26 and 28.

The load bed 12 also includes a generally flat load deck 30 extending between the sidewalls 18 and 20. Rear wheel well fenders 32 (FIG. 2) and 34 (FIG. 5) extend inboard from the deck sidewalls 18 and 20 as indicated. The tailgate 24 is movable about a horizontal hinge axis between the generally horizontal open position, FIG. 1, and the alternate or closed upright position, FIG. 2, in a conventional manner. Conventional latch means, not shown, are provided for securing the tailgate 24 in the upright closed position and a latch actuator or handle may be used to unlatch and move the tailgate 24 from its closed position to its open position. The latch handle may be lockable to prevent unauthorized operation of the tailgate 24.

Suitable latches are mounted on opposite sides of the tailgate 24 and provide for latching the tailgate in a closed position the latches are engagable with suitable latch pins which project from sidewall portions of the load bed in a conventional manner. The tailgate 24 forms a closure for the rear access opening 22, FIG. 5, delimited by the deck sidewalls 18 and 20 and the load deck 30. The tailgate 24 is of a type which can be operated by a manual, preferably lockable, operator handle, disposed on the tailgate outer wall to unlatch the tailgate for movement to its open position.

The tailgate structural features described above are generally conventional in light duty pickup trucks and other utility vehicles which have open load beds. Such tailgate construction is also conventional in station wagons or similar utility type motor vehicles and may also be of the two-way type which includes suitable mechanism for moving the tailgate about a vertical hinge axis by suitable hinge couplings, not shown in the drawing.

Figure 3:
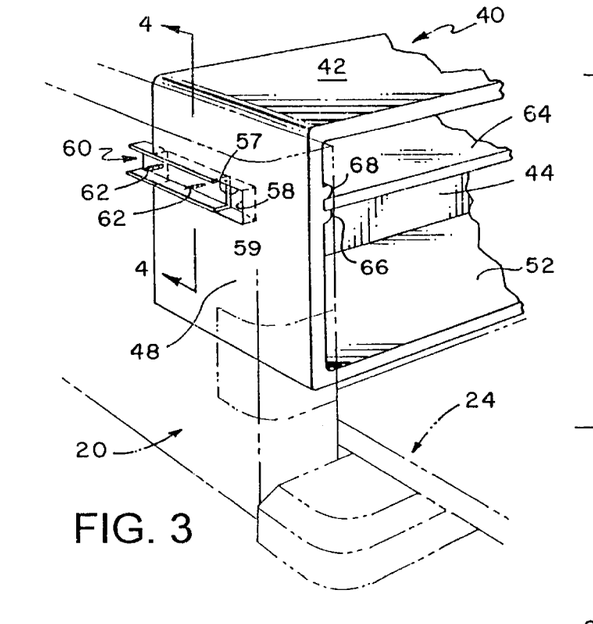
FIG. 3 is a rear perspective view thereof, partly in phantom and partly broken away, showing the storage enclosure mounted on a sidewall slip rail.

Referring further to FIGS. 1 through 3, a unique enclosure for storing tools, equipment, supplies and other materials or articles is illustrated and generally designated by the numeral 40. The storage enclosure 40 is constructed for mounting across the rear deck 30 of the load bed 12, immediately behind the fenders 32, 34 and just forward of the tailgate access opening 22.

The storage enclosure 40 includes a generally horizontally extending top panel 42 which has a width less than the distance between the beams 26 and 28 so that the storage enclosure 40 can be inserted horizontally through the access opening 22 between the beams. The storage enclosure 40 also includes a depending forward panel 44 which extends substantially normal to the top panel 42. The depending forward panel 44 has an overall height which sets its lower edge 46 in close proximity to or even in slidable engagement with the load deck 30, as shown in FIG. 2, in the full-sized embodiment.

Figures 5, 6:
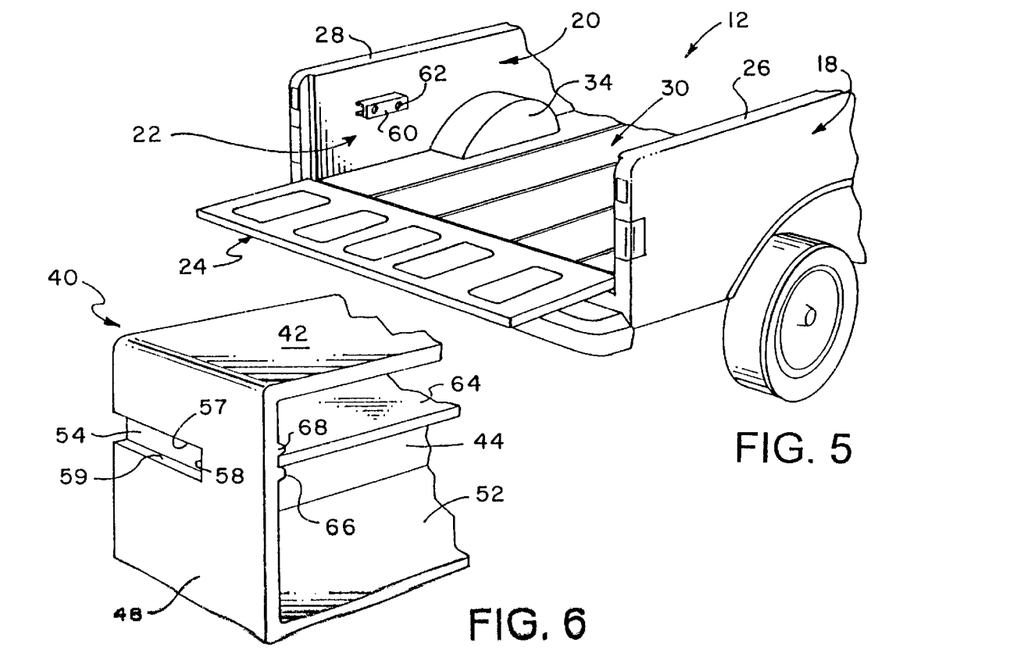
FIG. 5 is a rear perspective view of the load bed and sidewall slip rail, with the storage enclosure removed from the load bed.
FIG. 6 is a perspective view of the storage enclosure, partly broken away, showing a slip rail receiver slot formed in the left sidewall of the enclosure.

The storage enclosure 40 further includes a depending left side panel 48 (FIG. 6), a depending right side panel 50 (FIG. 1) and a bottom panel 52 (FIG. 6). The panels are interconnected and sealed together, thereby defining top, forward, left side, right side and bottom boundaries of the interior storage compartment. The rear access opening of the storage enclosure 40 is presented substantially flush with the load bed access opening 22 when the storage enclosure 40 is in the operative position as shown in FIG. 1 and FIG. 2. In this full-sized embodiment, the left and right side panels 48, 50 have an overall height so that the external surface of the top panel 42 is flush with the beam portions 26, 28 and the bottom panel 52 is disposed in slidable engagement with the load deck 30, as shown in FIG. 1.

The transverse width of the storage enclosure 40 may extend substantially between the load deck sidewalls 18 and 20 or be somewhat less than the distance between the side-walls. The overall height of the storage enclosure 40, with respect to the deck 30, is preferably about the same or slightly less than the height of the tailgate 22 in its closed position. The forward panel 44 may extend forwardly to a position just behind the fenders 32, 34, for example. The bottom panel 52, which extends between the depending side panels 48, 50, may be provided with an elastomeric cushion suitably secured thereto and slidably engageable with the load deck 30, as shown in FIG. 2. The cushion member may be made of a suitable resilient elastomeric material and may extend substantially along the bottom panel 52 between the opposed side panels 48, 50. The cushion member remains interposed between the bottom panel 52 and the load deck 30 in supportive relationship to the storage enclosure in the operative position shown in FIG. 1.

Figure 4:
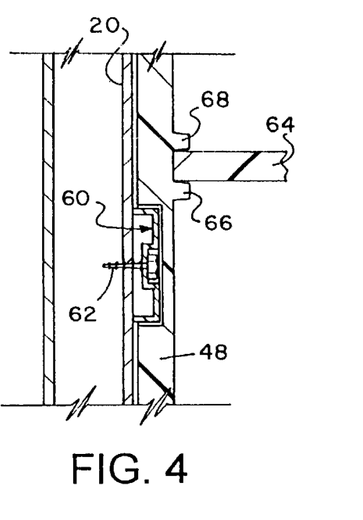
FIG. 4 is a sectional view taken along the line 4—4 of FIG. 3, showing engagement of the storage enclosure on the sidewall slip rail of FIG. 3.
Figure 8:
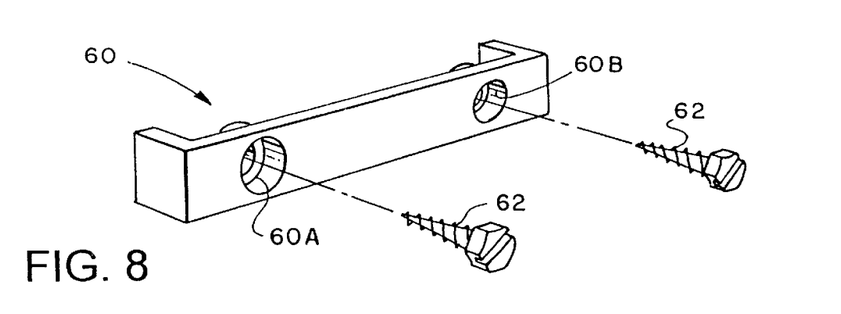
FIG. 8 is a perspective view of the slip rail shown in FIG. 5.

The storage enclosure 40 is supported on the deck sidewalls 18, 20 by male and female coupling members. In the preferred embodiment, the left side panel 48 and the right side panel 50 include a pair of female coupling members in the form of linear guide slots or slip channels 54, 56, respectively. Each guide slot is open on one end, as shown in FIG. 6, in which the guide slot 54 is bounded by parallel guide shoulders 57, 59 and by a stop shoulder 58 thereby forming a blind pocket for receiving a male coupling member, for example a support rail 60 as shown in FIG. 3, FIG. 4 and FIG. 8. The guide slot 56, shown in FIG. 2, is identical in construction with the guide slot 54.

Referring now to FIG. 3, FIG. 4 and FIG. 5, the male coupling members are preferably in the form of an elongated rail 60, also referred to as a support rail. The support rails are attached by threaded sheet metal fasteners 62 onto each deck sidewall 18, 20, respectively, at a position vertically intermediate the deck 30 and sidewall beams 26, 28, respectively, and also horizontally intermediate the tailgate 24 and the wheel well fenders 32, 34, respectively. The support rails 60 are aligned in parallel with the load deck 30 and are equally spaced with respect thereto.

The support rails 60 are dimensioned for a sliding fit through the slip channel guide slots 54, 56 and project laterally into the load deck space so that the support rails 60 can be inserted simultaneously into the side panel slots 54, 56 as the storage enclosure is pushed through the tailgate access opening 22. The guide slots 54, 56 are aligned in parallel with each other, and are vertically spaced with respect to the lower edge 46 of the front panel so that the storage enclosure can be slid forward along the load deck 30 with its guide shoulders riding on the support rails 60.

Although the preferred form of the support member 60 is an elongated rail or U-shaped channel member as shown in FIG. 8, other support forms can be used to good advantage. For example, the enclosure support function can be provided by one or more square blocks, dimensioned for a sliding fit through the slip channel guide slots, or alternatively, the support function can be provided by one or more cylindrical disks attached to the deck sidewalls or by one or more rollers mounted for rotation on the deck sidewalls. All such alternative support member embodiments provide slidable engagement and support, and also block vertical removal of the storage enclosure from the load bed 12.

The storage enclosure 40 is installed in the operative position (FIG. 1) by sliding it forward, with the support rails 60 inserted within the slip channel guide slots 54, 56. The storage enclosure slides along the support rails until the support rails are fully inserted and brought into engagement with the stop shoulder 58, or until the forward panel 44 engages the wheel well fenders 32, 34, as shown in FIG. 2. The rear access opening of the storage enclosure is presented flush with the tailgate access opening 22, so that articles in the storage enclosure are immediately accessible when the tailgate 24 is open, and is secured against unauthorized removal when the tailgate is closed.

Vertical movement of the storage enclosure 40 relative to the load bed 30 is blocked by engagement of the support channel guide shoulders 59 against the slip rails 60. Forward movement of the storage enclosure is blocked by engagement of the support rails against the stop shoulders 58, or by engagement of the storage enclosure against the rear wheel well fenders 32, 34. Rearward movement of the storage enclosure is blocked by the tailgate 24 when it is in the closed position. However, the storage enclosure 40 can be quickly removed from the load bed without tools simply by moving the tailgate 24 to the open position as shown in FIG. 1 and pulling the storage enclosure along the support rails 60 until the storage enclosure separates from the load bed 12.

Referring again to FIG. 1, the storage enclosure 40 is partitioned by an intermediate panel 64 that is supported on its opposite ends between internal support shoulders 66, 68. Preferably, the support shoulders 66, 68 are integrally formed with each depending side panel, thus defining a pair of longitudinal slots for receiving the end portions of the intermediate panel. The bottom panel 52 can be omitted in the full-sized embodiment, in which case the load deck 30 forms the lower boundary of the storage compartment.

Figure 7:
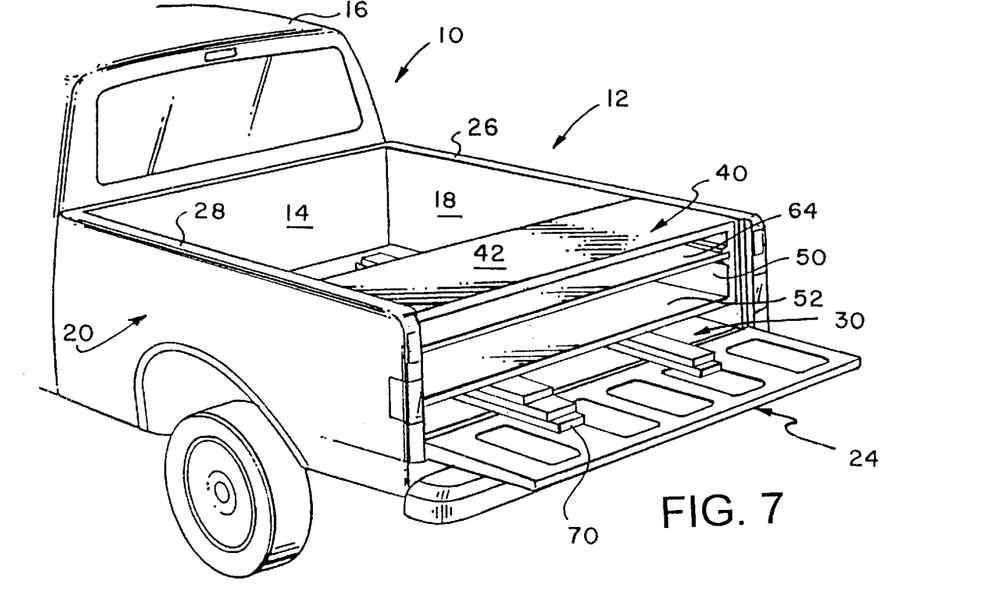
FIG. 7 is a rear perspective view similar to FIG. 1 showing a reduced size storage enclosure mounted on sidewall slip rails with the storage enclosure elevated from the load deck.

Referring now to FIG. 7, an alternative embodiment of the storage enclosure 40 is illustrated. In this alternative arrangement, the height of the forward panel 44, the left side panel 48 and the right side panel 50 is reduced, so that the bottom panel 52 of the enclosure is elevated from the load deck 30. Preferably, the bottom panel 52 is elevated by six inches or more from the load deck 30 so that the full length of the load deck can be utilized for carrying over-sized articles such as lumber 70. Such over-sized articles ride on the tailgate 24 and may extend beyond the tailgate 24 when it is in the open position. Moreover, the inner surface of the tailgate 24 can be advantageously utilized as a work surface in close proximity to the storage enclosure 40 when the tailgate is in the open position.

In the reduced-size embodiment shown in FIG. 7, the storage enclosure 40 is installed in the same manner as the full-sized embodiment of FIG. 1, i.e. by sliding the enclosure 40 along the support rails 60 until the support rails are fully inserted against the stop shoulders 58 of the guide slots 54, 56. Forward movement of the reduced-size embodiment is limited by engagement of the support rails 60 against the slip channel stop shoulders 58, and by engagement of the front panel against the wheel well fenders.

In both embodiments, the storage enclosure 40 can be removed from the load bed to permit on-loading or off-loading of large items through the tailgate access space 22, and can be quickly set up in the operative position adjacent the tailgate opening simply by sliding the storage enclosure along the support rails 60. Alternatively, the storage enclosure 40 can be completely removed from the load deck when it is necessary to use the entire load deck space. Both installation and removal can be performed without tools or other special equipment.

An alternative mounting arrangement will now be described with reference to FIG. 9, FIG. 10, FIG. 11, FIG. 12 and FIG. 13. The load bed 12 of certain vehicles is provided with interior pockets 72 formed on the inside surface of the left and right deck sidewalls 18, 20. Typically, such pockets are relatively shallow, for example about one inch in depth, and extend about six inches in length and three inches in height. The pockets are typically located near the tailgate end of the load bed, and are spaced vertically about midway between the load deck and the beam portions 26, 28 of the deck sidewalls.

Figure 9:
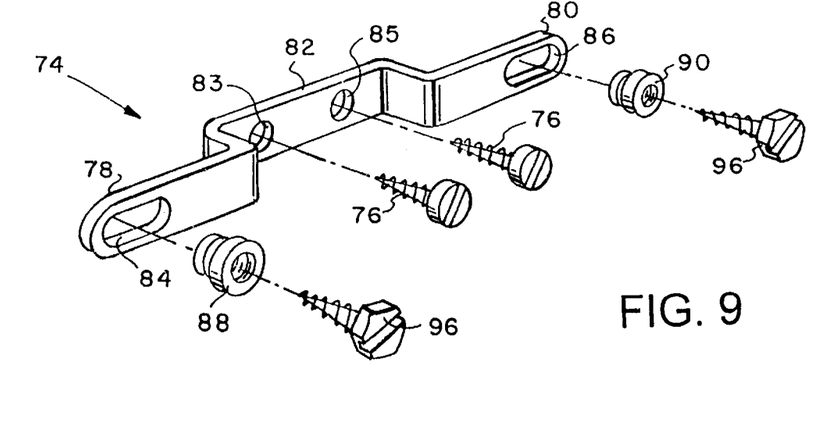
FIG. 9 is a perspective view of a sidewall anchor bracket.
Figure 10:
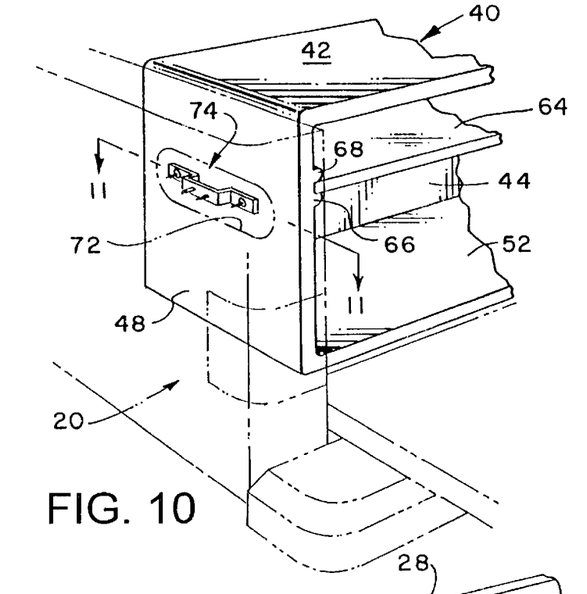
FIG. 10 is a rear perspective view, similar to FIG. 3, of an alternative mounting arrangement in which the storage enclosure is mounted by screw fasteners onto the anchor bracket of FIG. 9.
Figure 11:
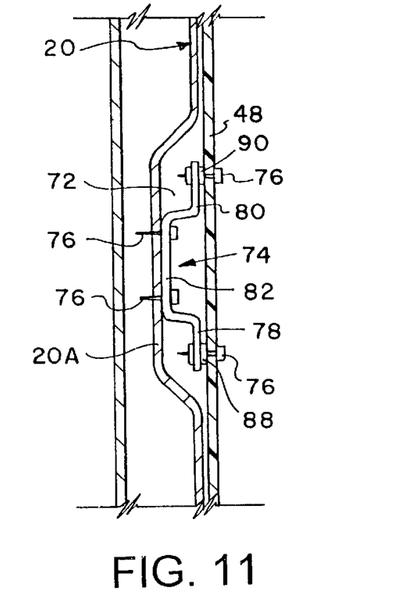
FIG. 11 is a sectional view taken along the line 11—11 of FIG. 10, showing attachment of the storage enclosure onto the anchor bracket.

According to this alternative mounting arrangement, a mounting bracket 74, shown in detail in FIG. 9, is attached to the pocket panel 20A inside of the pocket 72 by sheet metal screw fasteners 76. The mounting bracket 74 includes a pair of coupling arms 78, 80 that are laterally offset with respect to a mounting base 82. The mounting base 82 is intersected by a pair of bore holes 83, 85 that receive the screw fasteners 76. When the mounting base 82 is secured against the pocket panel portion 20A, the coupling arms 78, 80 extend substantially in flush alignment with the inside surface of the load bed sidewall panel 20. The coupling arms 78, 80 are intersected by slots 84, 86 in which threaded screw nuts 88, 90 are secured.

Referring again to FIG. 13, the storage enclosure 40 is adapted for attachment to the mounting bracket 74 by a pair of bore holes 92, 94 that are pre-drilled through the depending side panels 48, 50. The bore holes are located at a mounting height that corresponds with the vertical height of the mounting bracket 74 relative to the load deck 30, and are spaced apart to match with the longitudinal spacing between the slots 84, 86 of the mounting bracket 74.

Figures 12, 13:
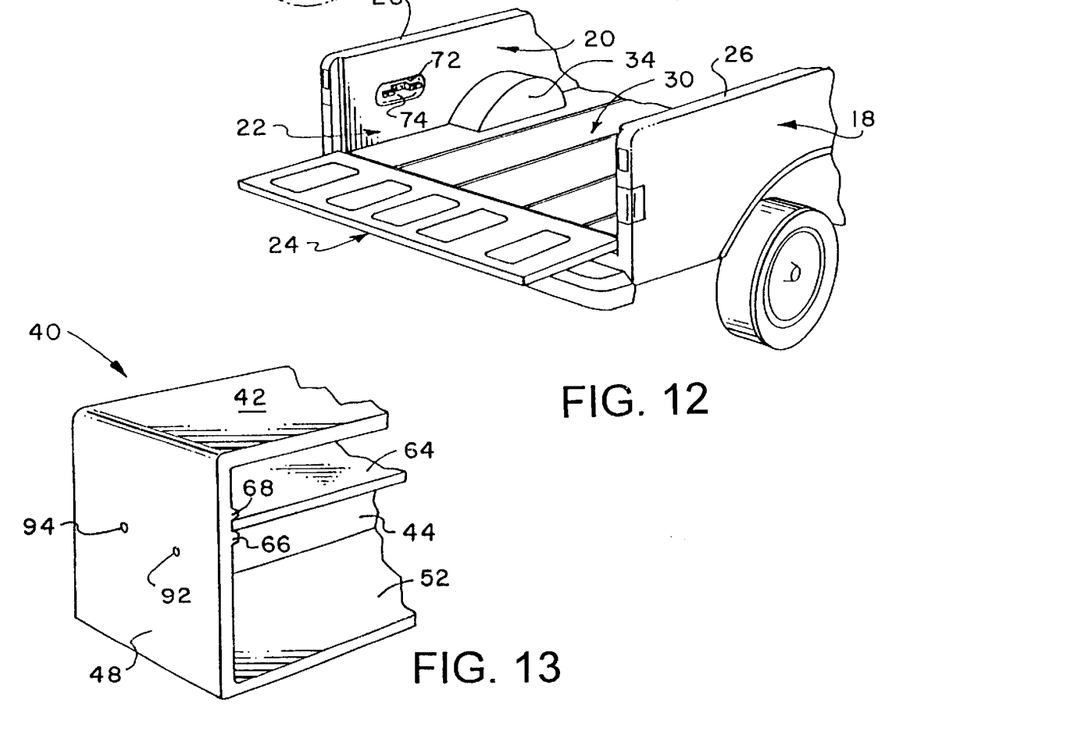
FIG. 12 is a rear perspective view of the truck load bed and deck sidewalls showing a typical installation of the sidewall anchor bracket of FIG. 9.
FIG. 13 is a perspective view of the storage enclosure, partly broken away, which includes bore holes aligned with the anchor bracket of FIG. 12.

The storage enclosure 40 is installed on the load deck 12 by sliding it along the load deck 30 until the bore holes 92, 94 are aligned with the screw nuts 88, 90 on the coupling arms of the mounting brackets 74. The depending side panels 48, 50 are then rigidly attached to the mounting brackets 74 by sheet metal screw fasteners 96 that are inserted through the bore holes 92, 94, respectively, and in threaded engagement with the screw nuts 88, 90, respectively.

Referring again to FIG. 10, FIG. 11 and FIG. 12, the mounting bracket 74 is nested within the pocket 72 with its coupling arms 78, 80 positioned substantially in flush alignment with the inside face of the deck sidewall. The nested, flush arrangement of the mounting bracket 74 provides a quick, convenient attachment point for the storage enclosure 40, but does not project into the load deck space or otherwise interfere with loading or unloading operations.

Figure 14:
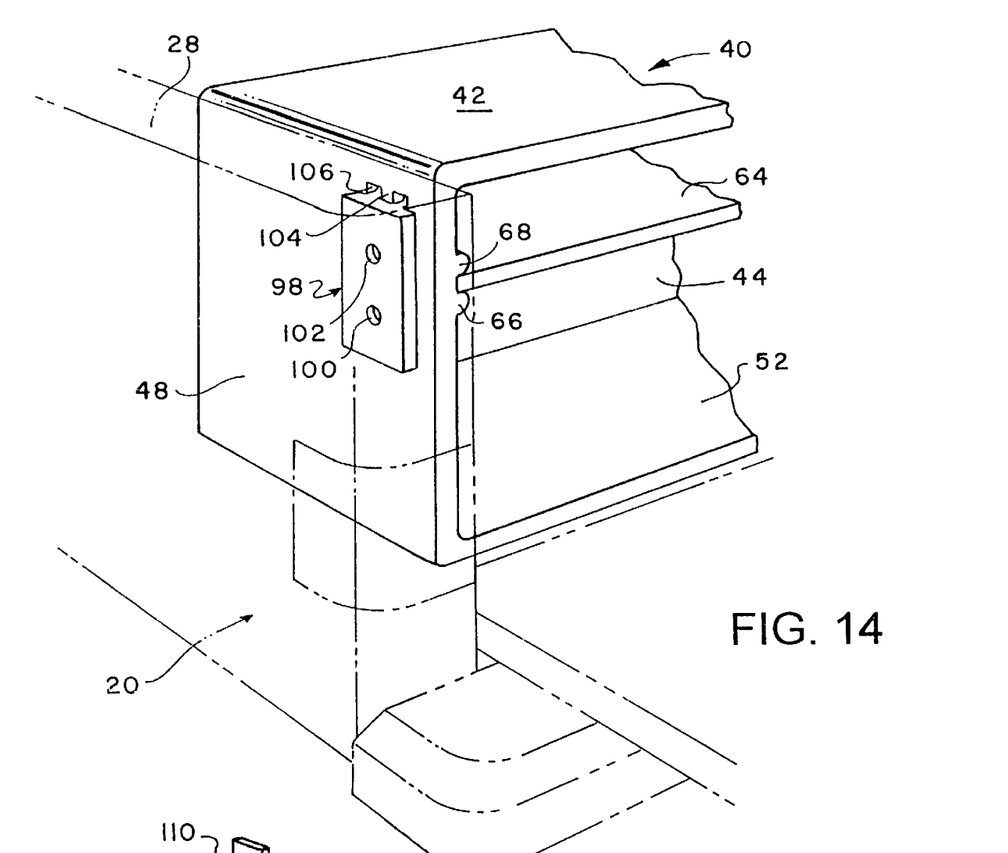
FIG. 14 is a rear perspective view of an alternative mounting arrangement, in which a shim pad is interposed between the load deck sidewall and the sidewall of the storage enclosure; and, FIG. 15 is a perspective view of the shim pad shown in FIG. 14.
Figure 15:
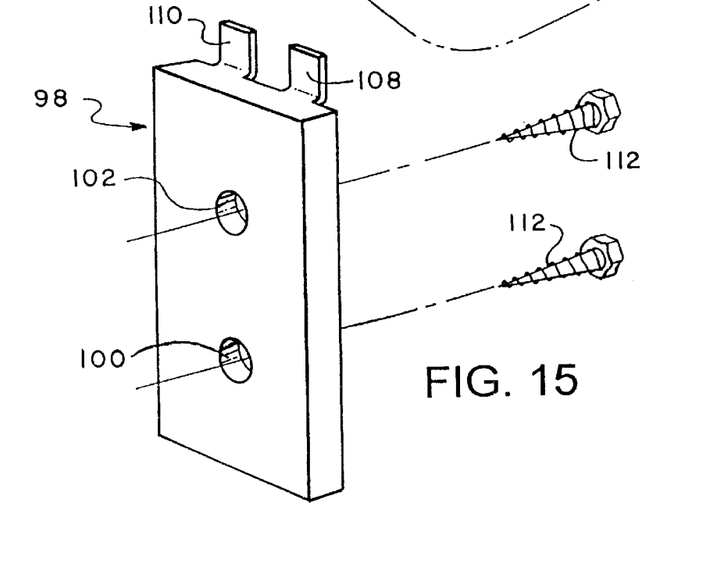

Yet another alternative mounting arrangement is illustrated in FIG. 14 and FIG. 15. According to this arrangement, a shim pad 98 is interposed between the load deck sidewalls and the left and right side panels, respectively. Each shim is intersected by a pair of vertically aligned bore holes 100, 102 that are alignable in registration with a pair of bore holes that are drilled through the left and right side panels, respectively. Additionally, the left and right side panels of the enclosure are intersected by a pair of horizontally aligned notches 104, 106. A pair of tangs 108, 110 project from the upper end of the shim 98, and are horizontally spaced for insertion into the notches 104, 106, as shown in FIG. 14.

The storage enclosure 40 is made ready for assembly onto the load bed 12 by first attaching the shims 98 onto the depending side panels 48, 50 with the tang portions 108, 110 fully inserted within the notches 104, 106. The tang portions 108, 110 of the shims 98 are inserted into the notches 104, 106 of the side panels 48, 50, attaching the shims 98 to the side panels 48, 50. The tang portions 108, 110 support the shim pad 98 in flush hanging engagement against the side panel, and also position the bore holes 100, 102 for alignment with the counterpart bore holes formed in the side panels. The storage enclosure 42 is then slid through the tailgate access opening 22, bringing the bore holes 100, 102 into registration with pre-drilled tap bores in the left and right deck sidewalls 18, 20. Threaded sheet metal screws 112 are then inserted through the aligned bore hole openings in the side panel 48 and shim 98 and are torqued in threaded engagement with the deck sidewalls, thus securely attaching the storage enclosure 40 to the load deck.

The enclosure 40 is preferably fabricated of a suitable engineering material such as sheet steel or aluminum, or reinforced plastic, for example. The fabrication of the storage enclosure 40 may be in accordance with conventional manufacturing processes, including molding of plastic materials. The enclosure 40 is proportioned such that, in the closed position of the tailgate 24, the rear transverse edge of the top panel 42 is contiguous with the top transverse edge of the tailgate. The peripheral edge portions of the storage enclosure that frame the rear access opening may have an suitable resilient seal strip attached thereto, not shown, for engagement against the tailgate to form a substantially weather-tight seal, if desired.

What is claimed is:

1. A storage enclosure for installation on a motor vehicle of the type including a load deck, opposed left and right deck sidewalls and a tailgate extending between the opposed deck sidewalls and movably coupled to the load deck, the storage enclosure comprising:

enclosure panel means defining a storage compartment having an access opening; and, male and female coupling members adapted for installation on the enclosure panel means and on the right and left deck sidewalls, respectively, in slidable, mating engagement with each other, the male and female coupling members limiting vertical movement of the storage enclosure relative to the load deck while allowing forward longitudinal movement of the storage enclosure over the load deck to an operative position in which the access opening of the storage enclosure is disposed adjacent the tailgate and allowing reverse longitudinal movement of the storage enclosure over the load deck to a disengaged position in which the storage enclosure is separated from the load deck sidewalls.

2. A storage enclosure as set forth in claim 1, the enclosure panel means including first and second side panels, the female coupling members comprising:

first and second guide slots formed on the first and second side panels, respectively.

3. A storage enclosure as set forth in claim 1, the male coupling members comprising:

first and second elongated support rails mountable onto the left and right deck sidewalls, respectively.

4. A storage enclosure as set forth in claim 1, the enclosure panel means including first and second side panels, and a front panel, wherein the female coupling members comprise elongated slots formed between guide shoulder portions of the first and second side panels, the elongated slots being vertically spaced with respect to the lower edge of the front panel, whereby the storage enclosure can be moved forward along the load deck of the motor vehicle with the guide shoulder portions riding on the male coupling members.

5. A storage enclosure as set forth in claim 4, wherein each elongated slot is bounded on one end by a stop shoulder and the storage enclosure is movable to an operative position overlying the load deck with the access opening of the storage enclosure being presented substantially in alignment with the tailgate opening when the male coupling members are engaged against the stop shoulders.

6. The storage enclosure as set forth in claim 1, including rear wheel well fenders disposed in the load bed space, the enclosure panel means being dimensioned to provide that the access opening of the storage compartment is positioned substantially in alignment with the tailgate opening and the storage enclosure is engaged against the rear wheel well fenders in the operative position.

7. In a motor vehicle of the type including an open load bed having a load deck extending between a left deck sidewall and a right deck sidewall, a tailgate opening extending between the sidewalls and a tailgate mounted for movement between a generally upright closed position and a generally horizontally extended open position, the improvement comprising:

a first support member mounted on and projecting from the left deck sidewall;

a second support member mounted on and projecting from the right deck sidewall;

a storage enclosure disposed on the load bed, the storage enclosure including a transverse top panel sized to fit between the deck sidewalls, a depending front panel connected to the top panel thereby defining a forward boundary of an enclosure space, and first and second depending side panels connected to the top panel thereby defining left and right side boundaries of the enclosure space, the first side panel being intersected by an elongated guide slot receiving and slidably engaging the first support member on the left deck sidewall, and the second side panel being intersected by an elongated guide slot receiving and slidably engaging the second support member on the right deck sidewall; and, wherein each guide slot is bounded on one end by a stop shoulder and the storage enclosure is installed in an operative position overlying the load deck with the access opening of the storage enclosure being positioned substantially in alignment with the tailgate opening when the sidewall support members are engaged against the stop shoulders.

8. The improvement as set forth in claim 7 wherein the guide slots are formed between shoulder portions on the side panels and are vertically spaced with respect to the lower edge of the front panel, whereby at least sliding clearance is provided between the storage enclosure and the load deck, and the storage enclosure can be moved forward along the load deck with the shoulder portions riding on the support members.

* * * * *